Patented July 7, 1953

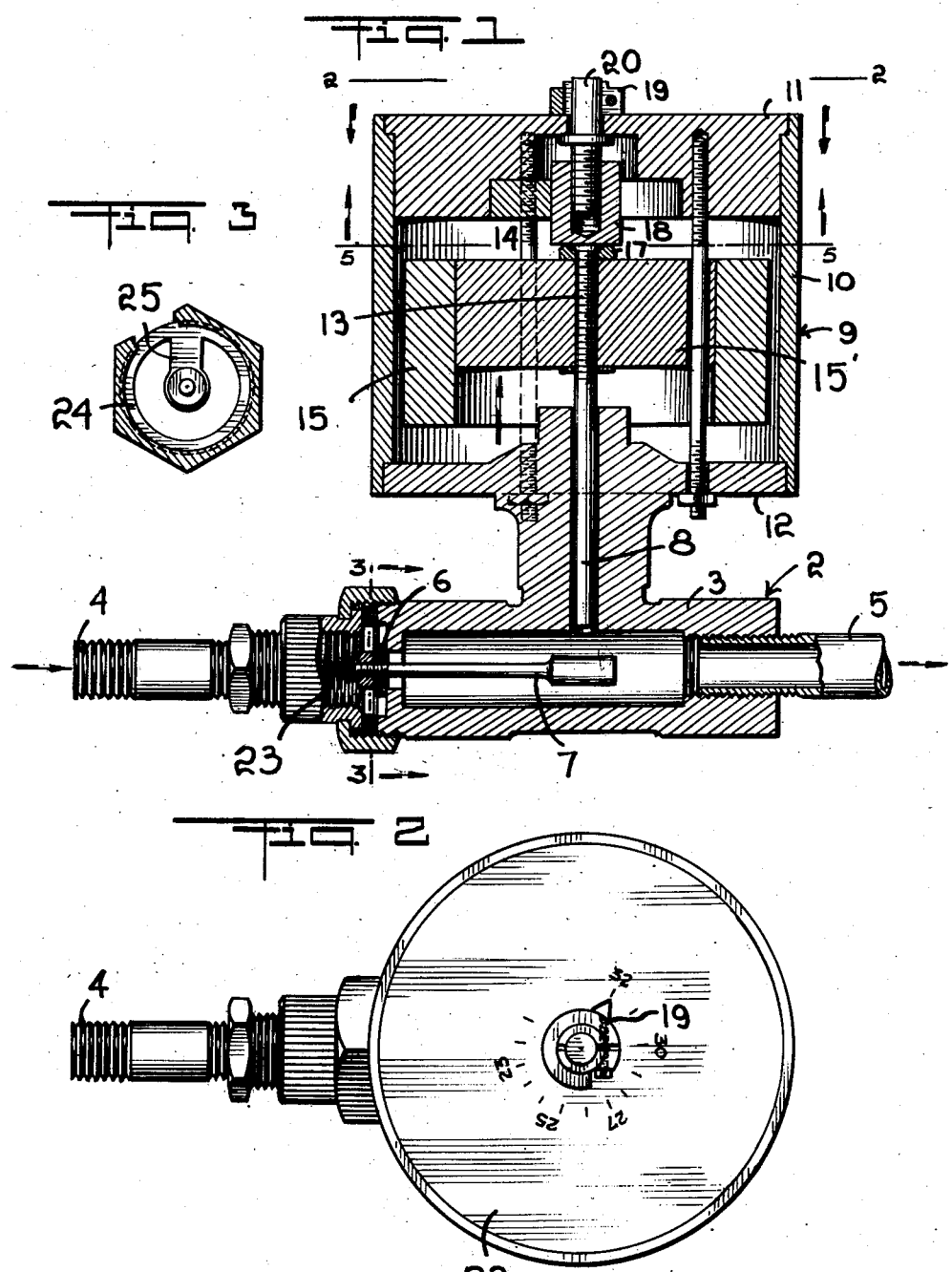

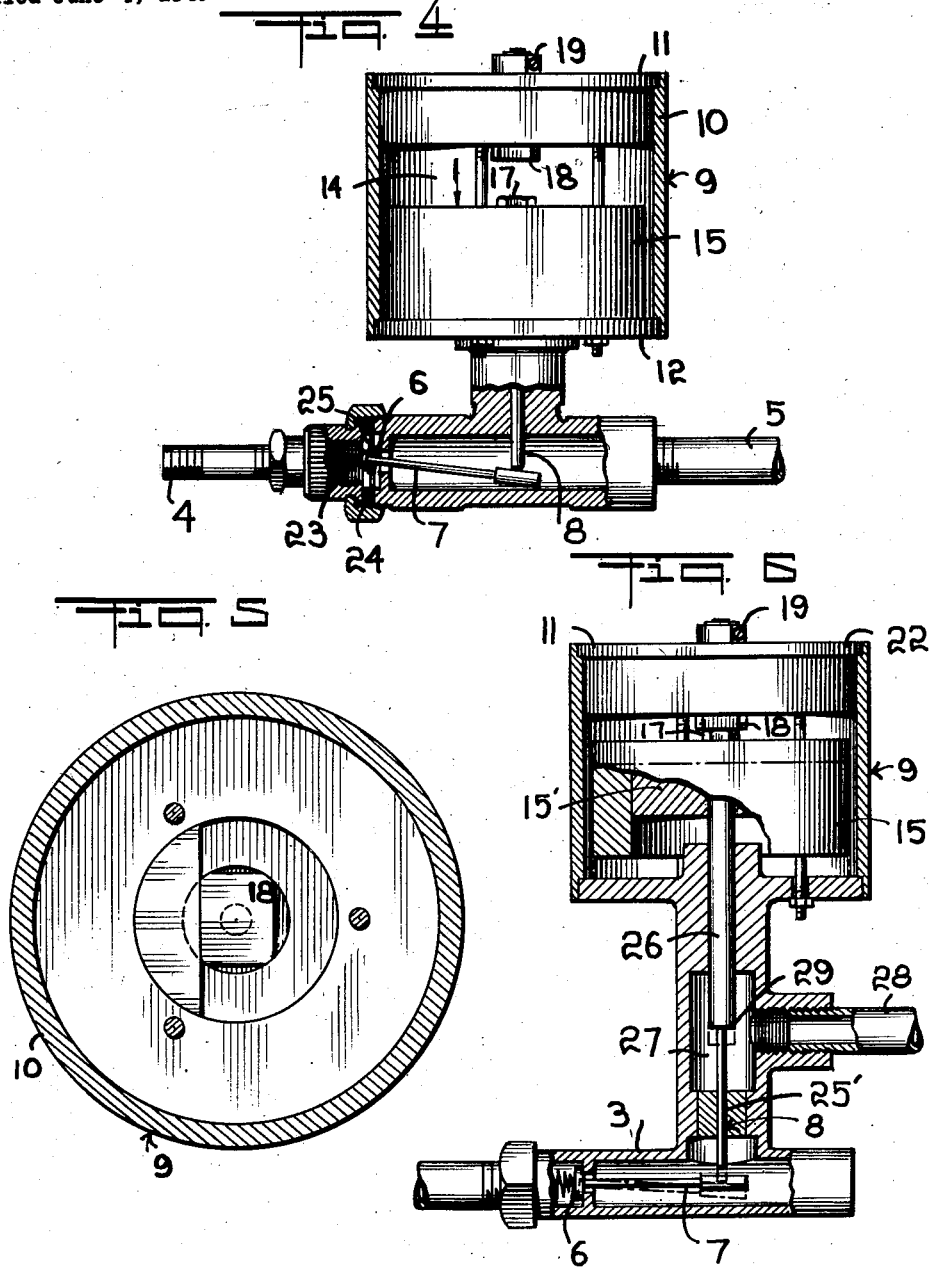

2,644,477

UNITED STATES PATENT OFFICE 2,644,477

MAGNETICALLY BIASED FLUID PRESSURE RESPONSIVE VALVE

George R. King, Houston, Tex.

Application June 4, 1949, Serial No. 97,172

5 Claims. (Cl. 137—224)

The invention relates to a pressure control device.

An object of the present invention is to provide a pressure control device which automatically maintains a predetermined pressure within a container.

Another object of the invention is to provide an apparatus for supplying air under pressure from sources which contain such air to a receiver to be inflated to a predetermined amount.

Still another object of the invention is to provide a pressure control device which automatically inflates a receiver to a predetermined amount of pressure.

Another object of the invention is to provide a pressure control device for charging a receiver with compressed air from the source of such air, such device including a conduit connecting the source with the receiver, a valve controlling communication between the source and conduit and means movable laterally of said conduit to open said valve to pass air through the conduit to the receiver when air pressure in the receiver is less than a predetermined amount.

A further object of the invention is to provide a pressure control device for inflating a tire, said device including means to limit the amount of air pressure supplied to the tire, and movable means operable by gravity to open a valve in the pressure control device to supply air to the tire when the pressure in the tire is less than the limit.

A still further object of the invention is to provide a control device for regulating pressure in a container, said control device including a conduit to conduct a fluid under pressure, a valve in the conduit, means movable laterally of the conduit to open the valve, said means being movable to open the valve when the pressure in the container falls to a predetermined amount.

Still a further object of the invention is to provide a pressure control and regulator device which is simple in operation and can be economically manufactured.

Other and further objects and advantages of the invention will become more readily apparent from a consideration of the following description and drawings, wherein:

Fig. 1 is a vertical sectional view, partly in elevation, illustrating the preferred embodiment of the invention when it is used to charge a receiver with a predetermined amount of compressed air;

Fig. 2 is a view on the line 2—2 of Fig. 1;

Fig. 3 is a vertical sectional view on the line 3—3 of Fig. 1 illustrating the preferred embodiment of the construction of the valve mechanism;

Fig. 4 is a vertical sectional view, partly in elevation, of the device illustrated in Fig. 1 showing the operation of the device;

Fig. 5 is a sectional view on the line 5—5 of Fig. 1; and

Fig. 6 is a vertical sectional view, partly in elevation, illustrating an alternate embodiment of the invention.

The device is denoted generally by the number 2 in Fig. 1 and is shown as comprising a conduit 3 adapted to be connected at its ends 4 with the source of compressed air while the receiver may be secured on the end 5 of the device. A valve 6 controls communication between the source and the conduit 3 and extending longitudinally of the conduit 3 is a stem 7 secured to the valve 6.

Extending laterally of the conduit 3 is the piston 8 arranged in the housing 9. The housing 9 may be any desired shape including non-magnetic walls 10 and magnetic end plates 11 and 12. Secured to the upper end 13 of the piston 8 in the chamber 14 in the housing 9, is a spider 15' to which is secured a permanent magnet 15. The weight of the magnet member 15 is such that it normally forces the piston down as illustrated in Fig. 4. The attraction between the magnet and end plate 12 will cause the member to be attracted towards the end plate as the magnet approaches such plate. When this occurs the piston 8 engages the stem 7, secured to the valve 6, and cocks it in open position so that compressed air or other fluid medium may be passed from the source through the conduit 3 and to the receiver on the end 5 of such conduit. So long as the piston and stem remain engaged the valve 6 will remain cocked open to permit the unrestricted flow of the fluid medium, such as air, therethrough. However, when the pressure in the conduit 3 is sufficient to exert a force great enough on the end of the piston 8 to move it upwardly, such piston disengages from the stem 7 whereupon the valve 6 snaps closed. Since the end plate 11 of the housing 9 is of magnetic material the "effective weight" of the ring 15 will be reduced as the magnet becomes closer to such end plate because of the attraction thereof for the end plate 11.

The piston 8 and ring 15 secured to the upper end 13 thereof, will move upwardly within the housing 9 until the stop 17 engages the stop 18 on the end plate 11. The ring and piston will remain in this upward position, as illustrated in Fig. 1, until the pressure within the conduit 3 has fallen below a sufficient amount to retain the ring and piston at that position. When the pressure in the chamber 3 falls below this "sufficient" amount, the ring 15 will fall due to the force of gravity moving the piston 8 downwardly to engage the stem 7 whereupon the valve 6 is reopened to permit the passage of fluid medium therethrough.

The stop 18 is movable to regulate the amount of travel of the piston 8 laterally of the conduit 3, which in turn, regulates the amount of pressure contained within the receiver 5. To this end the rotatable knob 19 is secured on the stem 20 which threadably engages the stop 18. Rotation of the knob 19 moves the stop 18 up or down which in turn controls the amount of pressure to be supplied to the container or receiver. For example, the top 22 of the end plate 11 may be calibrated so that various positions of the knob 19 will in turn position the stop 18 so as to obtain a predetermined amount of pressure within the receiver.

Fig. 3 illustrates a preferred form of construction of the valve 6 arranged in the conduit 3, and is shown as including a ring 24 from which the valve is suspended by the strip 25 which is sufficiently resilient to permit the valve 6 to be cocked open and to close as illustrated in Figs. 4 and 1, respectively. At the same time, however, the strip 25 tends to hold the valve 6 in closed position and to supplement this tendency there may be provided a small compression spring 23 within the cap on the end of the conduit 3 to exert a force on the valve and axially thereof.

While it is believed that the operation of the invention is apparent from the foregoing, it will be assumed that the device is to be used in inflating a receiver such as an automobile tire. For purposes of illustration, it will be assumed that the tire is to be inflated to 32 lbs. as shown on the top 22 of the end plate 11 in Fig. 2. When the indicator knob 19 is in this position, the stop 18 will be at a level within the chamber 14 of the housing 9 so that the automobile tire will not be inflated above 32 lbs.

It will be further assumed that the automobile tire at the time of inflating, contains say 30 lbs. per square inch pressure. Therefore, when the air hose 5 is positioned on the valve of the automobile tire and opens such valve, the pressure within the automobile tire becomes the pressure within the supply conduit 3 adjacent the lower end face of the piston 8. This is not sufficient to retain the ring 15 and stop 17 against the stop 18; therefore, such ring and piston 8 will move downwardly laterally of the conduit to engage the stem 7 and open the valve 6 whereupon air pressure flows through the conduit to the automobile tire. Since the air flow is restricted at the valve stem in the automobile tire, the pressure in conduit 3 builds up somewhat rapidly so that the force exerted by the air on the end of piston 8 overcomes the weight of the ring 15 and the downward magnetic pull on the piston and the piston 8 moves up against stop 18. As such ring begins its upward movement the magnetic attraction between the end of the plate 11 and such ring tends also to move the ring 15 to the stop 18. The valve 6 will then close due to the up-stream pressure and the force exerted upon the valve by the spring 23.

This cycle of operation is continued until the tire is inflated to 32 lbs. per square inch. When this occurs the ring 15 and piston 8 will remain in contact with the stop 18. This is true because the stop 18 is moved to a position within the housing so that when the tire is inflated to 32 lbs. per square inch, there will be a sufficient amount of air pressure within the conduit 3 to retain the ring 15 and piston 8 upwardly thereagainst.

Similarly, the pressure controlled device may be set at any predetermined pressure by positioning the stop 18 within the housing 9 so that when a tire is inflated to this predetermined amount, it will be a sufficient force to retain the ring 15 and piston 8 up against the stop 18. It seems obvious, of course, that the position of the stop 18 within the housing 9 determines the ultimate total value of pressure to which the receiver, such as a tire, is to be inflated.

An alternate embodiment of the invention is illustrated in Fig. 6. This form of invention is adapted to be used where the pressure within a container is to be controlled by regulating the amount of fuel passing to a burner which creates pressure in the container.

The device is provided with a conduit 3, a valve 6 and stem 7 connected therewith similar in construction to that previously described. A piston 8 is arranged to move laterally of the conduit 3 to cock the valve 6 in open position. It is to be noted that the lower end 25' of the piston 8 is smaller in cross-section than the portion 26 in the chamber 27. A conduit 28 is connected into the chamber 27 and conducts pressure from the container in which the pressure is being controlled by the device.

So long as the pressure within the chamber 27 is sufficient to exert a force against the shoulder 29 to retain the piston 8 out of engagement with the stem 7, the valve 6 will remain closed. However, if the pressure within such chamber falls below a predetermined amount, the piston 8 will move laterally of the conduit 3, contact the stem 7 and cock the valve 6 in open position. This will allow a fresh surge of fuel to pass through the conduit 3 to burners which furnish heat to maintain the pressure within the container.

The indicator knob 19 may adjust the stop 18 so as to position it at a point within the housing to maintain a predetermined pressure within the container to which the conduit 28 is connected.

While it is believed that the operation of this alternate form of the invention is apparent from the foregoing, it will be assumed that the construction, as illustrated in Fig. 6, will be utilized to regulate the pressure in a boiler. The conduit 3 can be secured to a suitable fuel line, such as gas or the like, and the indicator knob 19 will be positioned at the predetermined pressure at which it is desired to maintain the boiler. So long as the pressure in the boiler remains at least equal to the pressure indicated on the top 22 of the end plate 11, the piston 8 and ring 15 will remain in their upmost position in contact with the stop 18. This cuts off the fuel supply to the burners and prevents over-heating and excessive pressure within the boiler. When the pressure within the boiler falls below the pressure indicated by the knob 19, which positions the stop 18 at the location in the housing 9, equivalent to such pressure, the piston 8 will move laterally of the conduit 3 because of gravity and magnetic pull between the bottom end plate and ring 15 to cock the valve in open position.

This will permit the flow of fuel to the burners which in turn increases the pressure within the boiler. Fuel may be admitted through the conduit 3 until the pressure within the chamber 27 in the conduit 28 moves the piston 8 out of engagement with the stem 7.

It is to be noted that the provision of a permanent magnet on the piston in cooperation with the end plates 11 and 12 accomplishes two purposes.

Because of the magnetic attraction between the end plates 11 and 12 and the magnet 15, as the magnet approaches up or down position in the housing 9, the attraction between the magnet and end plates prevents hunting of the piston as it approaches open or closed position in the operation of the device.

Also, the magnetic attraction between the end plates and the magnet cause the piston to react with a snap action as it approaches either its closed or open position.

Broadly the invention contemplates a pressure control apparatus for automatically supplying a fluid medium to a receiver until the receiver contains a predetermined pressure.

What is claimed is:

1. A device for charging a receiver with compressed air supplied from a source of such air comprising, a conduit connecting the source with a receiver to be filled, a valve controlling communication between the source and conduit, a stem connected to said valve and extending longitudinally of said conduit, a weighted piston extending laterally of said conduit and communicating therewith, a magnetized member secured to said piston, said piston movable by gravity and magnetic attraction to contact said stem to cock said valve in open position whereby air is conducted through said conduit to the receiver, said piston being movable from contact with said stem by the force of sufficient air pressure acting against said piston to release said valve from its cocked open position.

2. A device for charging a receiver with fluid supplied from a source of such fluid comprising, a conduit connecting the source with a receiver, a valve controlling communication between the source and conduit, a stem connected to said valve and extending longitudinally of said conduit, a movable piston extending laterally of said conduit and communicating therewith, a magnetized member secured to said piston, a cylinder including non-magnetic walls and paramagnetic end plates, an adjustable stop secured in one end plate to regulate the length of stroke of said piston which determines the amount of fluid injected into said receiver, said piston movable by gravity and magnetic attraction to contact said stem to cock said valve in open position to pass fluid from the source through said conduit to the receiver, said piston being movable from contact with said stem by the force of sufficient fluid pressure acting against said piston to release said valve from its cocked open position.

3. A device for charging a receiver with compressed air supplied from a source of such air comprising, a conduit connecting the source with a receiver to be filled, a valve controlling communication between the source and conduit, a stem connected to said valve and extending longitudinally of said conduit, a movable piston extending laterally of said conduit and communicating therewith, a magnetized member secured to said piston, a cylinder including non-magnetic walls and magnetic end plates enclosing said member, an adjustable stop secured in one end plate to regulate the length of stroke of said piston, said piston being movable by the force of gravity and magnetic attraction to contact said stem to cock said valve in open position to pass air through said conduit into the receiver and releasing said valve from its cocked open position by the air pressure in said conduit forcing said piston off said stem.

4. A device for charging a receiver with fluid under pressure supplied from a source of such fluid comprising, a conduit connecting the source with a receiver to be filled, a valve controlling communication between the source and conduit, spring means normally urging said valve to closed position, means movable laterally of said conduit to open said valve, said movable means including a magnetized member, paramagnetic means positioned above and below said movable means to react to said magnetized member means secured in one of said paramagnetic means to regulate the length of lateral movement of said movable means, said movable means adapted to open said valve to pass the fluid through said conduit to the receiver when the fluid pressure in the receiver is less than a predetermined value.

5. A device for charging a receiver with fluid supplied from a source of such fluid comprising, a conduit connecting the source with a receiver to be filled, a valve controlling communication between the source and conduit, spring means normally urging said valve to closed position, means movable laterally of said conduit to open said valve, said movable means including a magnetized member, paramagnetic means positioned above and below said movable means to react to said magnetized member, means secured in one of said paramagnetic means to regulate the length of lateral movement of said movable means, said movable means adapted to open said valve to pass the fluid through said conduit to the receiver when the fluid pressure in the receiver is less than a predetermined amount, and indicating means associated with said regulating means to denote the predetermined amount of air pressure.

GEORGE R. KING.

References Cited in the file of this patent

UNITED STATES PATENTS

| Number | Name | Date |
| --- | --- | --- |
| 530,765 | Gaskill | Dec. 11, 1894 |
| 533,173 | Jadwin | Jan. 29, 1895 |
| 1,079,904 | Perkins | Nov. 25, 1913 |
| 1,618,815 | Cory | Feb. 22, 1927 |
| 2,067,882 | Alessi | Jan. 19, 1937 |
| 2,445,359 | Meidenbauer | July 20, 1948 |

FOREIGN PATENTS

| Number | Country | Date |
| --- | --- | --- |
| 3,525 | Great Britain | of 1897 |